US005264267A

United States Patent [19]

Wang

[11] Patent Number: 5,264,267

[45] Date of Patent: Nov. 23, 1993

[54] UTENSIL WITH GLITTERING HANDLE

[76] Inventor: Paul S. Wang, 13620 Benson Ave., Chino, Calif. 91710

[21] Appl. No.: 979,938

[22] Filed: Nov. 23, 1992

[51] Int. Cl.[5] .................... B32B 1/06

[52] U.S. Cl. .................... 428/76; 428/13; 446/267; 30/322; 30/324

[58] Field of Search .................... 428/13, 76; 273/457; 446/267; 30/340, 345, 322, 324

*Primary Examiner*—Alexander S. Thomas

*Attorney, Agent, or Firm*—Keith D. Beecher

[57] ABSTRACT

A novelty elongated handle for a child's spoon, fork or the like, which is formed of a rigid, transparent plastic material, such as acrylic. The handle is hollow to provide a transparent sealed chamber which is filled with a transparent liquid, such as water. A multiplicity of glittering particles are suspended in the liquid and float about in the liquid. The handle is constructed firmly to support the spoon, fork, or the like, at its forward end in isolated relationship from the chamber. The rear end of the handle is opened to permit the introduction of the liquid and glittering particles into the chamber. A resilient stopper is inserted into the open end of the handle and it, in turn, is covered by a plastic cap which is sealed to the rear end of the handle.

9 Claims, 2 Drawing Sheets

FIG. 1
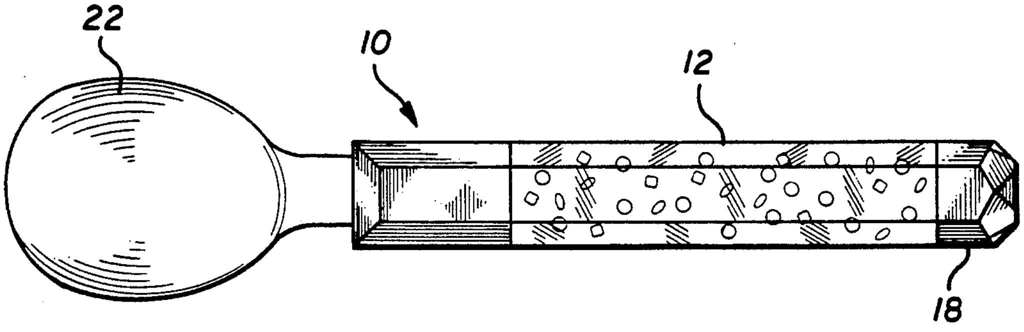
FIG. 2
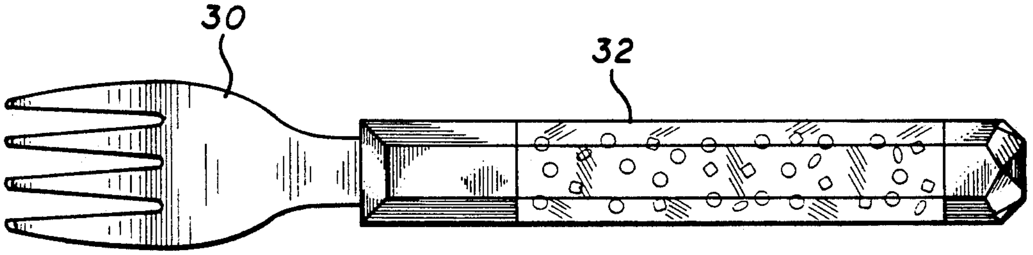
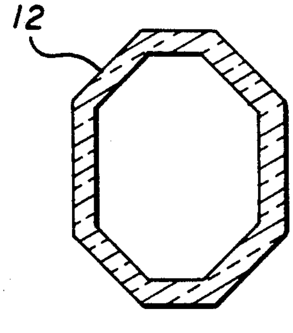
FIG. 4
FIG. 5
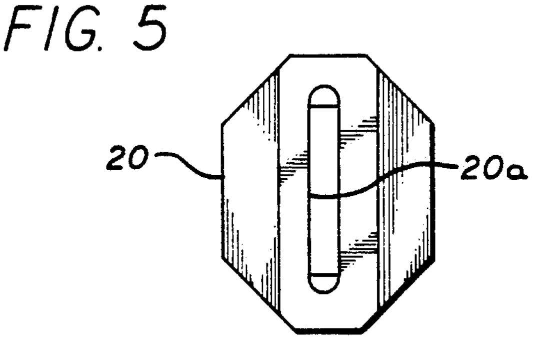
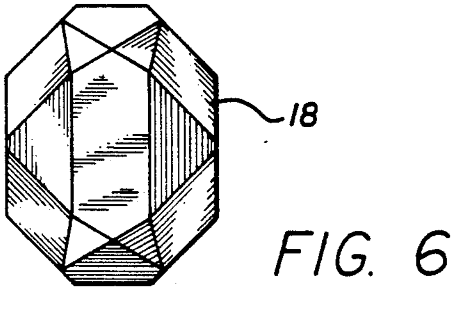
FIG. 6

UTENSIL WITH GLITTERING HANDLE

BACKGROUND OF THE INVENTION

Articles are known which are formed of transparent materials providing an internal sealed chamber in which floating objects may be observed. Such articles are described, for example, in U.S. Pat. Nos. 3,898,781; 4,362,299; 4,395,224; 2,703,082 and 4,738,888.

An objective of the present invention is to adapt the general concept referred to the in preceding paragraph into the handles of utensils, such as spoons, forks, or the like, particularly for the amusement of children.

SUMMARY OF THE INVENTION

A novelty handle is provided for utensils such as children's spoons, forks, or the like. The handle may be formed of any suitable rigid transparent plastic, such as acrylic, or other material. The handle is hollow to provide a transparent sealed interior chamber. The chamber is filled with a transparent liquid, such as water. A multiplicity of glittering objects are suspended in the liquid, and they float about in the liquid to be observed through the transparent handle. The front end of the handle is closed, and an integral forward section is formed at the front end which is insulated from the hollow interior of the handle. The shank of the utensil, such as a spoon or fork, is received in the forward section, and the shank is heat sealed, for example, to the forward section. This manner, the utensil is isolated from the hollow chamber. The rear end of the handle is open, so that the liquid and particles may be inserted into the chamber. A resilient rubber stopper is inserted into the open end, and it is covered by a plastic cap which is heat sealed or sonic weld to the rear end of the handle.

BRIEF DESCRIPTION OF THE DRAWINGS

FIG. 1 is a representation of a utensil, such as a spoon, equipped with an elongated handle incorporating the concepts of the invention;

FIG. 2 is a representation of a fork, which also includes an elongated handle incorporating the concepts of the invention;

FIG. 4 is a section taken along the line 4—4 of FIG. 3;

FIG. 5 is a section taken along the line 5—5 of FIG. 3; and

FIG. 6 is a section taken along the line 6—6 of FIG. 3.

DETAILED DESCRIPTION OF THE ILLUSTRATED EMBODIMENT

Figure 3:
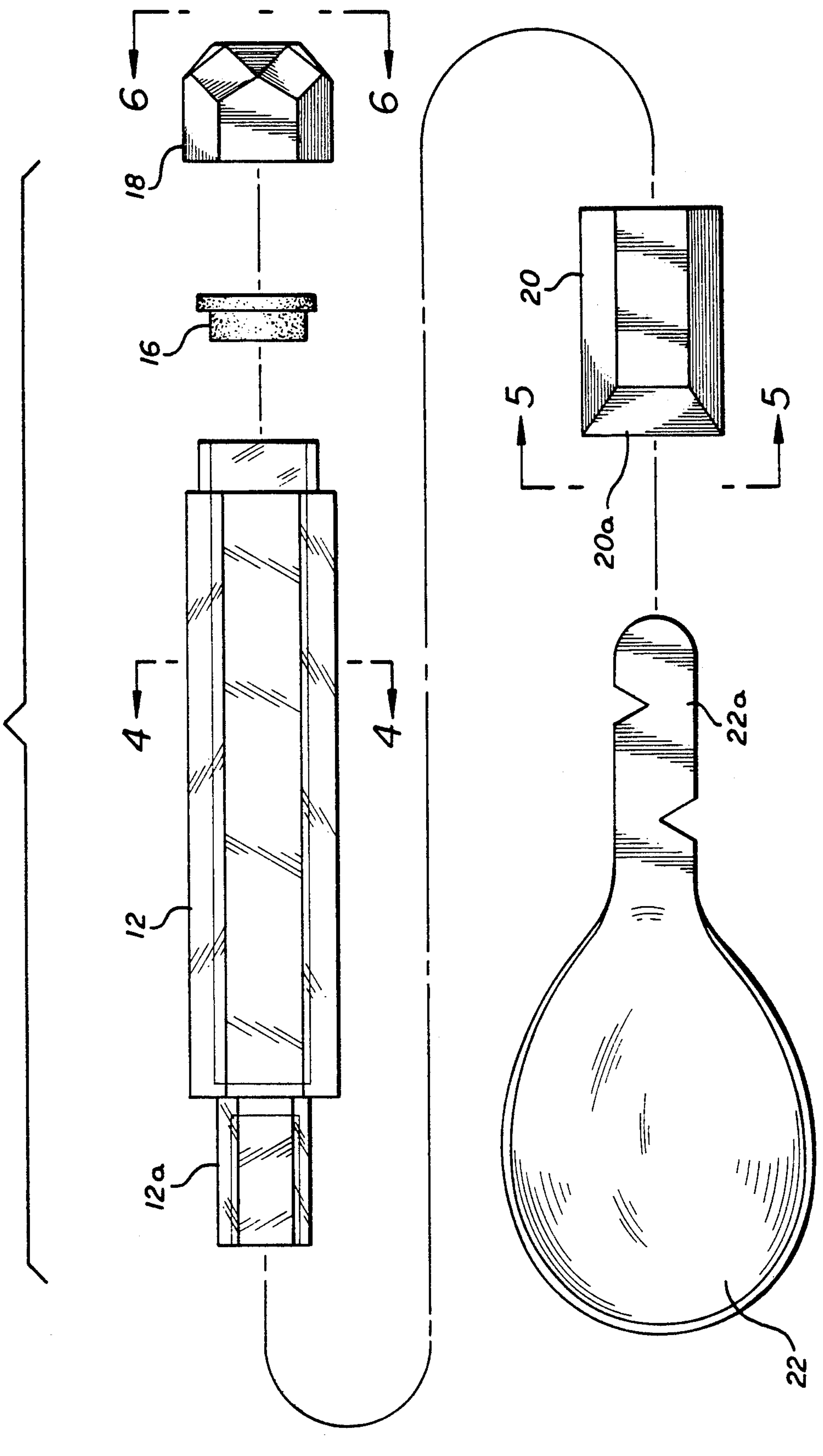
FIG. 3 is a detached view of the assembly of FIG. 1.

The utensil shown in FIG. 1 is designated generally as 10. The utensil has an elongated handle 12 which is formed, for example, of an appropriate rigid, transparent plastic material such as acrylic. The handle has an hexagonal cross-section, as shown in FIG. 4. The handle defines an internal sealed chamber 14 (FIG. 3) which is visible through the transparent material which forms the handle.

Chamber 14 is filled with transparent liquid, such as water, which is inserted into the chamber through the open rear end of the handle. A multiplicity of particles are also inserted into the chamber through the open rear end, and these particles float in the water. The particles are preferable glittering particles so as to provide a sparkling effect as they float about in the water in the chamber 14.

The chamber 14 is closed at its forward end and open at its rear end, as mentioned above. The open rear end is closed by a resilient stopper 16 formed of rubber, or of other appropriate material. A plastic cap 18 fits over the stopper 16 and holds it in place. Cap 18 may be secured to the rear end of handle 14 by a heat seal or sonic weld.

Handle 12 has an integral forward section **12*a* (FIG. 3) which is isolated from the chamber 14. A plastic cap 20 is fitted over the forward section 12*a*, and it has a slot 20 formed in its forward edge. Cap 20 may be heat sealed, for example, to the handle. A lot 20*a* in cap 20 receives the shank 22*a* of a spoon 22. The spoon is formed of stainless steel, or other appropriate material. Shank 22*a* extends through slot 20*a* into the section 12*a* of handle 12, and it is heat sealed in place. The spoon 22 is held firmly on the handle by the section 12*a*, its shank 22*a* is isolated from chamber 14**.

FIG. 2 is representation of a fork 30 having a handle 32 similar to the handle 12 of FIG. 1, and the assembly of FIG. 2 is constructed to have the same elements as the assembly of FIG. 1.

The invention provides, therefore, a simple and inexpensive utensil, such as a spoon, fork or the like, each of which is provided with an elongated rigid handle formed of transparent plastic material, such as acrylic, and which encloses a chamber filled with transparent liquid, with glittering particles floating in the liquid to create a unique display effect, and which supports the spoon, fork or the like in an end portion isolated from the chamber.

It will be appreciated that while particular embodiments of the invention have been shown and described, modifications may be made. It is intended in the claims to cover all modifications which come within the true spirit and scope of the invention.

I claim:

1. An article having an elongated handle, said handle being formed of a transparent material and being hollow to define an internal sealed chamber, a quantity of liquid in the chamber and a plurality of particles floating in the liquid, said handle having a closed forward end and an integral forward section formed at said forward end isolated from said internal chamber, and a utensil having a shank extending into said forward end and sealed thereto in isolated relation with said chamber.

2. The article defined in claim 1, in which the handle is formed a transparent, rigid plastic material.

3. The article defined in claim 2, and which includes a plastic cap mounted over said forward section of said handle and having a slot therein for receiving the shank of the utensil.

4. The article defined in claim 1, in which the utensil is formed of stainless steel.

5. The article defined in claim 1, in which said handle has an open rear end, and which includes a resilient stopper inserted into said open rear end.

6. The article defined in claim 5, and which includes a plastic cap mounted on the rear end of the handle over said stopper.

7. The article defined in claim 1, in which said particles are formed of a glittering material.

8. The article defined in claim 1, in which said utensil is a spoon.

9. The article defined in claim 1, in which said utensil is a fork.

* * * * *